United States Patent [19]

Cho

[11] Patent Number: 5,353,118
[45] Date of Patent: Oct. 4, 1994

[54] MOTION COMPENSATING SYSTEM USING INTERLACE-TO-SEQUENTIAL SCAN CONVERSION WITH MOTION AND TRANSMISSION COMPENSATION

[75] Inventor: Hyeon-deok Cho, Suwon-city, Rep. of Korea

[73] Assignee: SamSung Electronics Co., Ltd., Suwon, Rep. of Korea

[21] Appl. No.: 448,854

[22] Filed: Dec. 12, 1989

[30] Foreign Application Priority Data

Mar. 30, 1989 [KR] Rep. of Korea ................ 4113/1989

[51] Int. Cl.$^5$ ........................................... H04N 11/20
[52] U.S. Cl. ................................................. 348/451
[58] Field of Search ............. 358/11, 31; H04N 11/20

[56] References Cited

U.S. PATENT DOCUMENTS

| | | |
|---|---|---|
| 4,612,567 | 9/1986 | Pritchard . |
| 4,672,445 | 6/1987 | Casey et al. ........................ 358/11 |
| 4,831,463 | 5/1989 | Faroudja . |

FOREIGN PATENT DOCUMENTS 130295 7/1985 Japan ..................... 358/31

OTHER PUBLICATIONS

IEEE Communications Society "IEEE Global Telecommunications Conference" Dec. 2–5, 1985 NTS-Full Compatible Extended–Definition TV-Proto Model and Motion Adaptive Processing.

Rossi, Digital Technique for Reducing Television Noise, SMPTE Journal Mar. 1978 vol. 87 pp. 134–140.

Storey, HDTV Motion Adaptive Bandwidth Reduction Using DATV BBC Report PH–280 1986 p. 4.

*Primary Examiner*—John Shepperd
*Attorney, Agent, or Firm*—Robert E. Bushnell

[57] ABSTRACT

For a digital television including an analog/digital converter for converting interlaced scanning video signals into digital video signals, a motion compensating system comprises a color/brightness signal separator for separating the signal and the brightness signal of said digital video signal from each other; a picture transition sensing stage for detecting the amount of the horizontal and time motion of the picture by said brightness signal and the amount of the vertical transistion of the picture by said digital video signal to compare and compensate the two amounts, obtaining the signal of sensing the amount of the motion of the picture; and a mixer for interpolating the color signal, the brightness signal of the color/brightness separator and compensating the interpolated color signal and the brightness signal and the present color signal and the present brightness signal with the signal of the sensed amount of motion of the picture generated by the picture transition sensing stage.

5 Claims, 9 Drawing Sheets

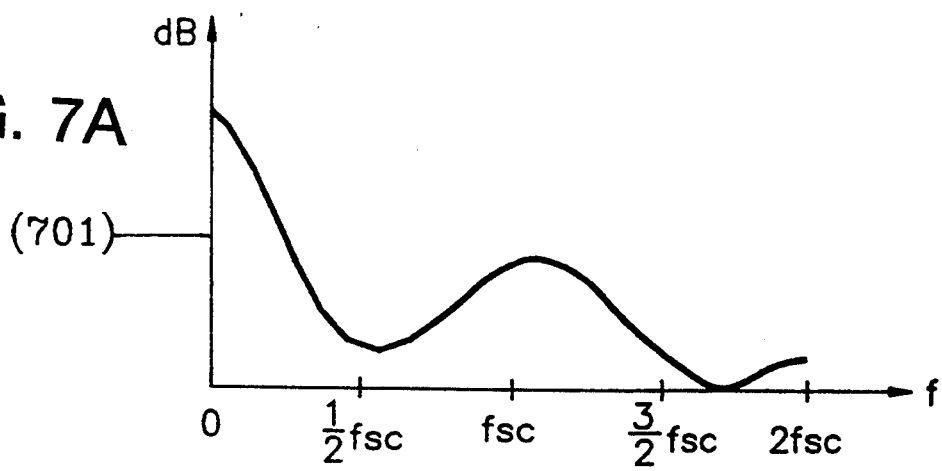
FIG. 7A (701)
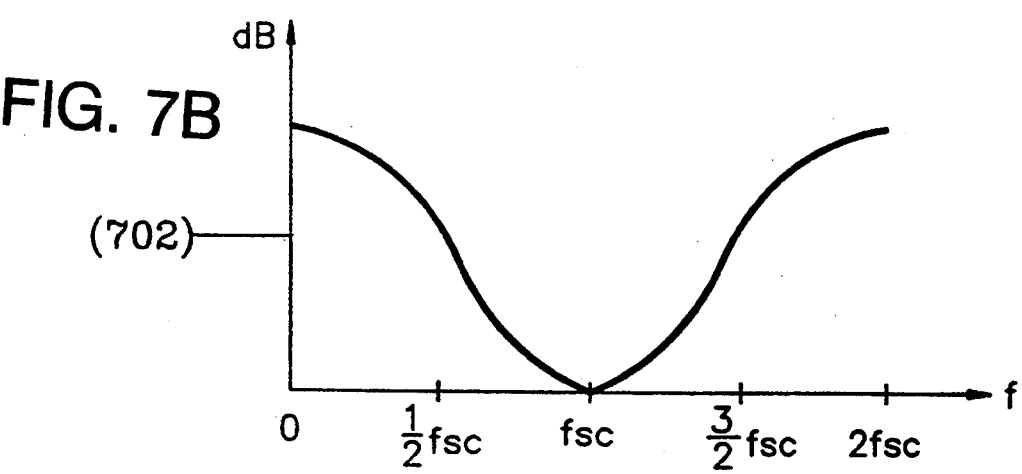
FIG. 7B (702)
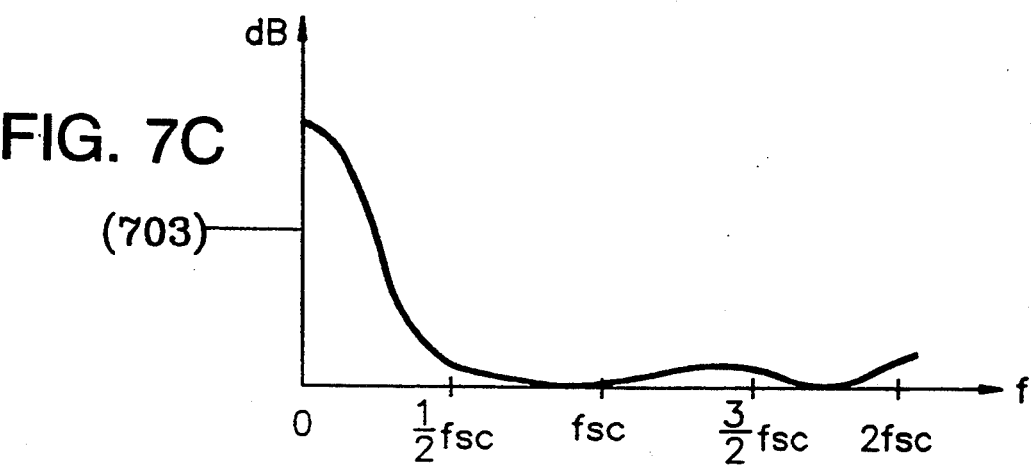
FIG. 7C (703)

MOTION COMPENSATING SYSTEM USING INTERLACE-TO-SEQUENTIAL SCAN CONVERSION WITH MOTION AND TRANSMISSION COMPENSATION

BACKGROUND OF THE INVENTION

The present invention relates to a system for transforming an interlaced scanning video signal into a sequential scanning video signal in a television.

Generally, the color TV broadcasting methods are classified into NTSC (National Television System Committee), PAL (Phase Alternation by Line), SECAM (Sequence de Couleurs Avec Memoirs). Additionally, the desire for a more clear color picture has caused to develop ID-TV (Improved Definition-TV), ED-TV (Extended Definition-TV), and HD-TV (High Definition-TV). The ID-TV method does not change the conventional broadcasting method, but changes the signal processing circuit of the TV to improve the picture resolution. The ED-TV does not change the broadcasting method but employs a pre-filter in the transmitter and a post-filter in the receiver, or otherwise the color signal is multiplexed with a high resolution component signal to improve the picture resolution, thus providing compatibility with the video signal of the conventional NTSC method. The HD-TV method transmits a video signal using two channels having a frequency band difference of 6 MHz, which gives much better resolution than the conventional color TV. The ID-TV or ED-TV method transforms the interlaced scanning video signal into the sequential video signal in order to employ a sequential scanning method whose resolution capability is much better than the conventional interlaced scanning method, where there often occurs a deterioration of data in the original picture.

SUMMARY OF THE INVENTION

An object of the present invention is to provide a motion sensing device for compensating for the lost video data by detecting the motion variation of the interlaced scanning video signal when transforming the interlaced scanning video signal into the sequential scanning video signal in a TV.

In a digital television including an analog/digital converter for converting an interlaced scanning video signal into a digital video signal, a motion compensating device of the present invention comprises: a color/brightness signal separator for separating the color signal and the brightness signal from the digital video signal; a picture motion sensing device for detecting the amount of the horizontal transition and time motion of the picture from the brightness signal, and the amount of the vertical transition of the picture from the digital video signal to compare and compensate the two resultant amounts in order to obtain a motion sensing signal indicative of the amount of the motion of a picture; and a mixer for interpolating the color signal and the brightness signal from the color/brightness separator and for compensating the interpolated color signal and the interpolated brightness signal and the present color signal and the present brightness signal with the motion sensing, whereby the two sets of the color signal and the brightness signal are being mixed to produce another color signal and another brightness signal.

BRIEF DESCRIPTION OF THE ATTACHED DRAWINGS

For a better understanding of the invention and to show how the same may be carried into effect, reference will now be made, by way of example, to the accompanying diagrammatic drawings, in which:

FIG. 7A through 7C illustrates the characteristics of each part of FIG. 6;

DETAILED DESCRIPTION OF THE PREFERRED EMBODIMENT

The present invention will now be more specifically described with reference to the drawings attached only by way of example.

Figure 1:
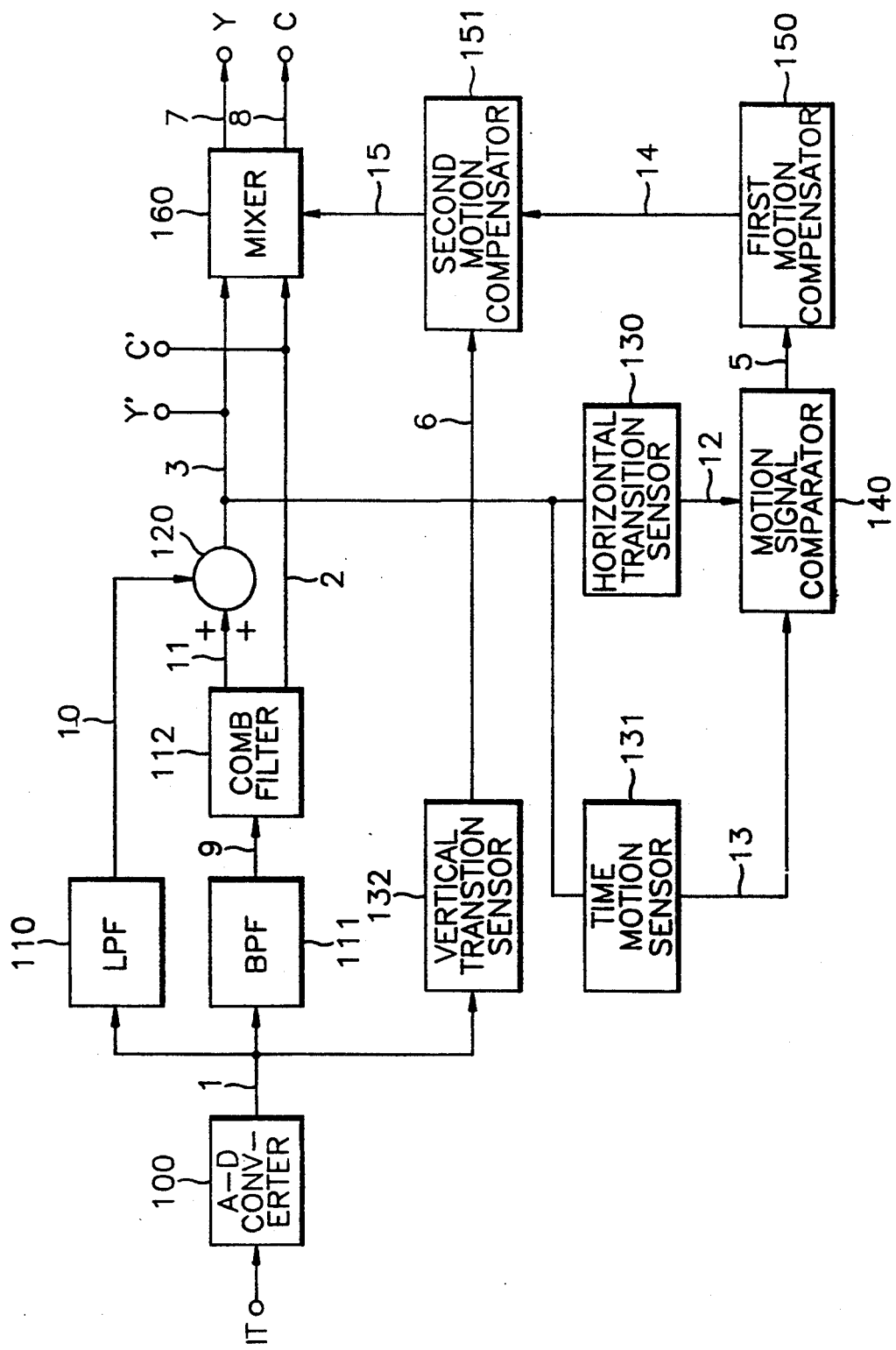
FIG. 1 is a block diagram for illustrating the present invention.

Referring primarily to FIG. 1, an analog-digital (A/D) converter 100 is to convert an interlaced video signal input through an input terminal IT into a digital video signal. The output of the A/D converter 100 is transmitted through line 1. Line 1 is connected to low-pass filter (LPF) 110 of a color/brightness separator which detects a brightness signal distributed in a low frequency region of the digital video signal by eliminating the digital video signal distributed in a high frequency region. The detected brightness signal is then output through line 10.

A color/brightness separator further comprises a band-pass filter (BPF) 111, a comb filter 112 and an adder 120 for separating a color signal and a brightness signal from the digital video signal. The band-pass filter (BPF)111 has an input terminal connected to line 1, for receiving the digital video signal and detecting only the digital video signal of a given frequency range to thereby produce an output signal through line 9. The comb filter 112 is connected to the band pass filter 111 via line 9, for separating a color signal and a brightness signal distributed in a first given frequency range from the output signal of the band-pass filter 111. The color signal and the brightness signal are then respectively output through lines 2 and 11. The adder 120 is connected to the comb filter 112 and the low pass filter 110 respectively through lines 11 and 10, for adding the brightness signals of lines 10 and 11 in order to separate the color signal and the brightness signal from each other, and producing an output through line 3.

A horizontal transition sensing device 130 has an input terminal connected to line 3, for detecting, as the horizontal motion component of the picture, the brightness signal of a high frequency range with reference to a second given frequency from the brightness signal of line 3.

A time motion sensing device 131 has an input terminal connected to line 3, for comparing the present brightness signal of line 3 with the low frequency component of the brightness signal of preceding picture so as to detect the difference as time-dependent motion variation which is output through line 13.

A motion signal comparator 140 has an input terminal connected to the horizontal transition sensing device 130 through line 12 and another input terminal connected to the time motion sensing device 131 through line 13, and compares the signals of the two lines 12 and 13 to output only the greater one through line 5.

A vertical transition sensing device 132 has an input terminal connected to line 1, for separating the brightness signal of a low frequency range from the digital video signal of line 1 so as to extract, as the vertical transition variation, the brightness signal of a second given frequency range from the brightness signal of the low frequency range. The output of the vertical transition sensing device 132 is transmitted through line 6.

Connected to the motion signal comparator 140 through line 5 is a first motion compensator 150 for generating a compensating value corresponding to the output signal of the motion signal comparator 140 through line 14 in order to compensate for the time-dependent motion variation of the picture.

A second motion compensator 151 serves as a motion variation detecting device to detect the time and space-dependent motion variation of the brightness signal. The second motion compensator 151 has an input terminal connected to the vertical transition sensing device 132 through line 6 and another input terminal connected to the first motion compensator 150 through line 14 so as to multiply the output of the first motion compensator 150 by a constant rate or to maintain it at a given level according to the output of the vertical transition sensing device 132, thereby detecting the time- and space-dependent motion variation of the picture. The output of the second motion compensator 151 is transmitted through line 15.

A mixer 160 has a first input terminal connected to the second motion compensator 151 through line 15, a second input terminal connected to the comb filter 112 through line 2, and a third input terminal connected to the adder 120 through line 3. The mixer 160 delays and filters the color signal and the brightness signal from lines 2 and 3, adjusts their proportions according to the motion sensing signal of line 15, and adds them, so as to generate the second brightness signal and the second color signal through respective output lines 7 and 8.

Referring now to FIGS. 2A through 2E, the video signal input into the A/D converter 100 through the input terminal IT has an analog form which is converted into a digital signal. The A/D converter 100 outputs the video signal converted into a digital video signal through line 1 to the low pass filter 110, the band pass filter 111 and the vertical transition sensing device 132.

The low pass filter 110 demodulates the brightness signal in the lower frequency region of the digital video signal, with reference to the frequency "$f_{sc}$" of the color carrier wave, while eliminating the video signal of other frequency ranges. The demodulated signal is then output through line 10 to the adder 120. The output frequency characteristic of the low pass filter 110 is shown in a characteristic graph 200 of FIG. 2A; and the gain characteristic is shown by the curve 201 arranged in the left side of the color carrier wave "$f_{sc}$".

The band pass filter 111 selects only the video signal of the frequency range of the color carrier wave from the digital video signal of line 1, and transmits the output through line 9 to the comb filter 112. In this case, the frequency characteristic of the band pass filter 111 has, as shown in a characteristic graph 210 of FIG. 2B, higher gain in the range of 3.58 Mhz±1 MHz, whereby 3.58 MHz is the center frequency of the color carrier wave. In the NTST broadcasting method, "I" and "Q" signals of a total chrominance signal are distributed in the range of 3.58 MHz±1 MHz, where the band width of the "I" signal is 1–1.5 MHz, and the "Q" signal is 0.5 MHz.

The comb filter 112 separates the output of the band pass filter 111 into the brightness signal of a high frequency range included in the frequency band of the color carrier wave and the color signal. The brightness signal is output through line 11 to the adder 120; and the color signal is output through line 2 to the mixer 160.

The adder 120 receives the low frequency brightness signal through line 10 from the low pass filter 110 and the high frequency brightness signal through line 11 from the comb filter 112, and adds the two signals. The added signal is then output through line 3 to the mixer 160, the horizontal transition sensing device 130, and the time motion sensing device 131, respectively. For the sake of convenience, the brightness signal output through line 3 from the adder 120 is called as a first brightness signal; and the color signal output through the line 2 from the comb filter 112 os called as a first color signal. The first brightness signal and first color signal are the brightness and color data per scanning line in one field.

The horizontal transition sensing device 130 connected to the adder 120 is a kind of a band-pass filter used to filter the first brightness signal so as to detect the horizontal transition sensing signal which is the first brightness signal of a high frequency region. The detected horizontal transition sensing signal is output through line 12 to the motion signal comparator 140.

Generally, the horizontal transition variation is determined by detecting the edge portion of the brightness signal which is the high frequency component of the brightness signal, i.e., the brightness signal existing in the frequency region of the color carrier wave. Hence, the frequency characteristic of the horizontal transition sensing device 130, as shown in a characteristic graph 230 of FIG. 2D, has a large gain around the frequency "$f_{sc}$" of the color carrier wave.

Meanwhile, the time motion sensing device 131 which is connected to line 3, is also connected to the horizontal transition sensing device 130 for receiving the first brightness signal from the adder 120 to compare the present first brightness signal with a preceding first brightness signal of a preceding frame in order to detect the time motion sensing signal and provide an output through line 13 to the motion signal comparator 140.

Then, the motion signal comparator 140 receiving the horizontal transition sensing signal through line 12 from the horizontal transition sensing device 130 and the time motion sensing signal through line 13 from the time motion sensing device 131 compares the two input signals with each other in order to output the greater one of them through line 5 to the first motion compensator 150. Here, if the compared output of the motion signal comparator 140 is "$Y_m$", the time motion sensing signal is "$X_t$", and the horizontal transition sensing signal is "$X_h$", then the compared output "$Y_m$" can be written in the following form:

$$Y_m = \text{MAX}(X_t, X_h) \quad (1)$$

The motion signal comparator 140 is to select one of the time motion sensing signal and the horizontal transition sensing signal, whose motion variation is greater than the other, for producing an output through line 5. The first motion compensator 150 connected to the motion comparator 140 through line 5, changes the level of the output signal of the motion signal comparator 140 to output the adjusted time or horizontal transition sensing signal through line 14 to the second motion compensator 151.

Figure 2A:
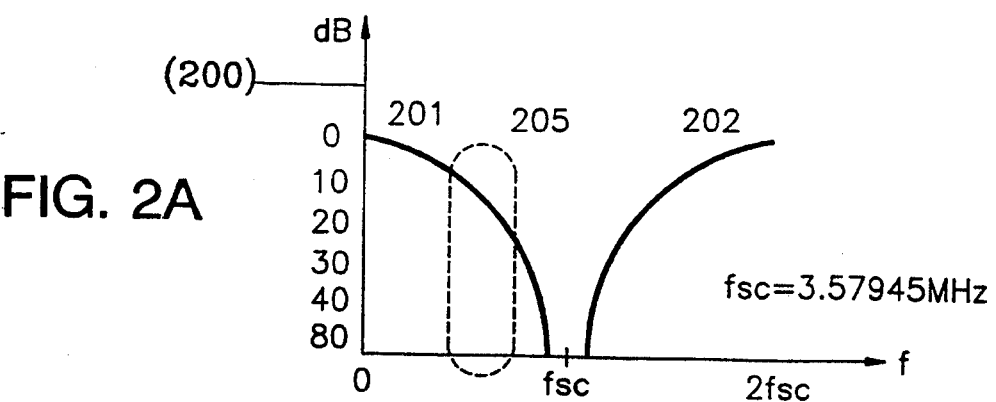
FIG. 2A through 2E illustrate the operational characteristics of FIG. 1.
Figure 2B:
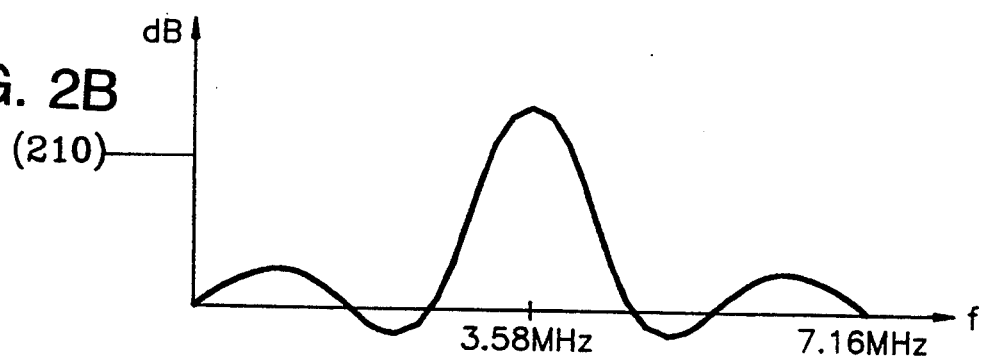
Figure 2C:
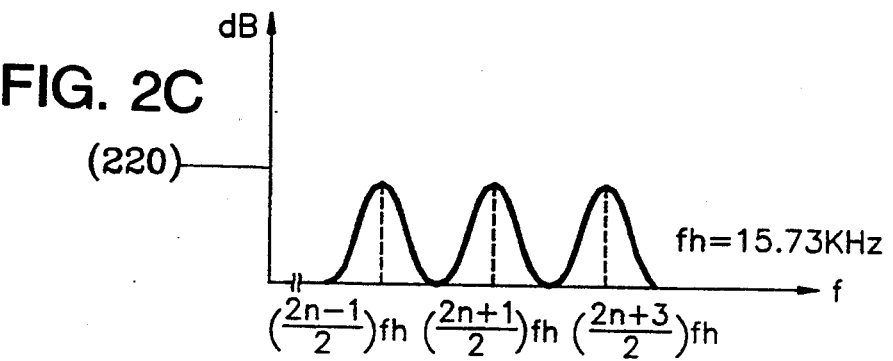
Figure 2D:
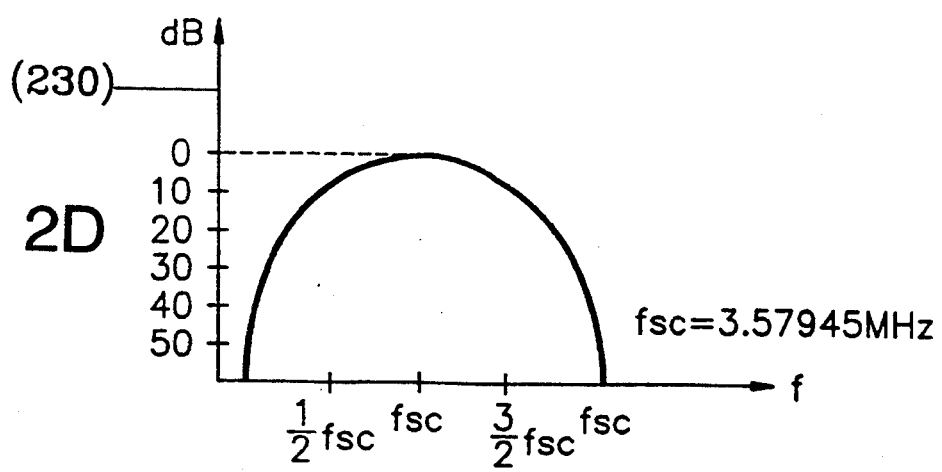
Figure 2E:
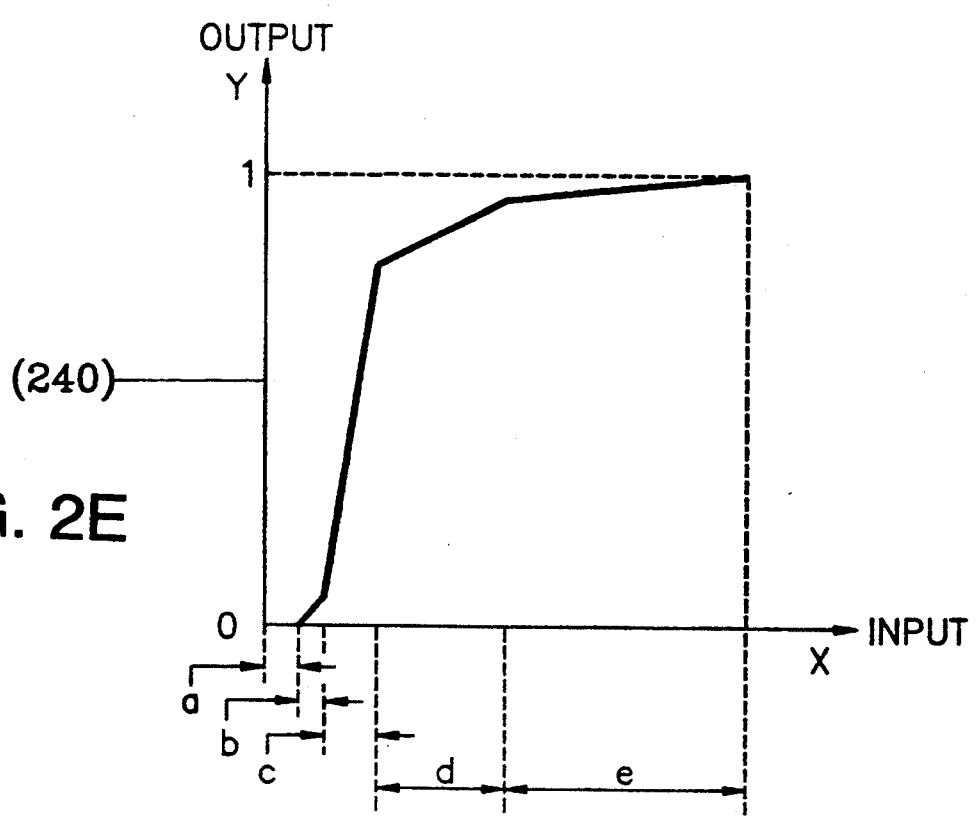

The first motion compensator 150 includes a memory element mapped in the input/output characteristic as shown in a characteristic graph 240 of FIG. 2E, which is described as follows. If it is assumed that a maximum output level of the motion signal comparator 140 as the input signal is 1, the input is x, and the output is y, the following relations are given:

If $0 \leq x < (1/16)$, then y=0, corresponding to the interval a;

If $(1/16) \leq x < (2/16)$, then y=x−(1/16), corresponding to the interval b;

If $(2/16) \leq x < (4/16)$, then y=7x−(13/16), corresponding to the interval c;

If $(4/16) \leq x < (8/16)$, then y=(¼)x+(11/16), corresponding to the interval d;

If $(8/16) \leq x < 1$, then y=(⅛)x+(14/16), corresponding to the interval e $\quad (2)$ In the characteristic graph 240 of FIG. 2E, if the input signal $x \leq (4/16)$, then the output level is about 1, representing the process of the almost complete dynamic region, while if the input x<(1/16), the output level y=o, representing the process of the static region. The remaining intervals represent the mixing of the static region and the dynamic region. The vertical transition sensing device 132 connected to line 1 to which the low pass filter 110 and the band-pass filter 111 are also connected, filters the output of the A/D converter 100 to extract a low frequency brightness signal by eliminating the color signal, and offsets the low frequency brightness signal by a period of ½$f_h$. Then, the vertical transition sensing signal of the ½$f_h$ offset low frequency signal is output through line 6 to the second motion compensator 151. The frequency characteristic of the vertical transition sensing signal has a frequency band gain characteristic as shown in the characteristic graph 200 of FIG. 2A, and is distributed in the curve 201. Observing the portion 205 of the curve 201 in FIG. 2B, it will be appreciated that the portion 205 has a spectrum as shown in the characteristic graph 200 of FIG. 2A. Thus, the vertical transition sensing signal has the brightness signal distributed in $(n+½)f_h$ which is distance farthest away from the horizontal scanning frequency $f_h$, for the brightness signal in the $(n+½)f_h$ has most of the vertical motion component.

Then, the second motion compensator 151 whose one input is connected to the vertical transition sensing device 132 through line 6; and other input is connected to the first motion compensator 150 through line 14, produces a motion sensing signal through line 15 to the mixer 160. The motion sensing signal has a given logic value preset according to the logic state of the output signal of the vertical transition sensing device 132, or has the level proportional to the output level of the first motion compensator 150 through line 15 to the mixer 160. The mixer 160 which receives the first color signal through line 2 from the comb filter 112, the first brightness signal through line 3 from the adder 120, and the motion sensing signal through line 15 from the second motion compensator 151, delays and filters the first color signal and the first brightness signal, while making the complement of the vertical sensing signal, and then enabling generation of the second color signal and the second brightness signal which are respectively output through lines 8 and 7. The second brightness and color signals are data interpolated for the sequential scanning. The first color signal and the first brightness signal are used for the odd horizontal line scanning, while the second color signal and the second brightness signal for the even horizontal line scanning. Thus, the color and brightness data for the sequential scanning are obtained by combining respectively the first and second brightness signals and the first and second color signals.

Figure 3:
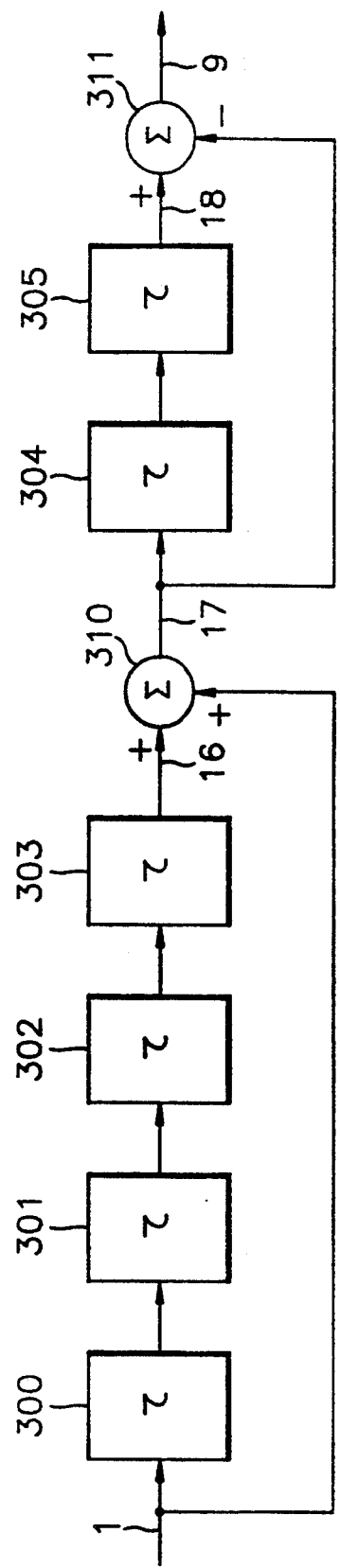
FIG. 3 is a detailed block diagram of the band pass filter of FIG. 1.

Referring to FIG. 3, the band-pass filter 111 comprises: four picture element delay circuits 300–303 connected in series between line 1 and line 16; an adder 310 for adding the video signal of line 1 and the delayed video signal from the picture element delay circuits 300–303 to produce an added signal through line 17; two picture element delay circuits 304, 305 connected in series between line 17 and line 18; and a subtractor 311 for subtracting the video signal of the adder 310 from the video signal of the two picture element delay circuits 304, 305.

Each of the four picture element delay circuits 300–303 delays the video signal of line 1 for a time delay period of one picture element, so that the picture element delay circuit 303 outputs through line 16 the video signal delayed by four picture elements. The adder 310 adds the video signal of line 16 and the video signal of line 1, output the resultant through line 17 to the picture element delay circuit 304 and the subtractor 311. Each of the two picture element delay circuits 304 and 305 delays the video signal input through line 17 from the adder 310 for a time delay period of one picture element, so that the video signal output through line 18 from the picture element delay circuit 305 is the signal obtained by delaying the video signal of line 17 for a time delay period of two picture elements. The subtractor 311 which is connected to the adder 310 and to the picture element delay circuit 305 respectively through lines 17 and 18, subtracts the output of the adder 310 from the output of the picture element delay circuit 305, to output the resultant through line 9 to the comb filter 112. The video signal of line 9 has the frequency "$f_{sc} \pm 1$ MHz" apart from the frequency of the carrier wave signal as the reference point, which means that the video signal within the high cut-off frequency "$f_{sc}+1$ MHz" is extracted by the four picture element delay circuits 300–303 operating as the low pass filter and by the adder 310, and the video signal having the frequency higher than the low cut-off frequency "$f_{sc}-1$ MHz" by the two picture element delay circuits 304 and 305 operating as the high pass filter and by the subtractor 311. The input/output relationship of the band pass filter is expressed by Equation (3).

$$X_o(n) = X_i(n) + X_i(x-rI) - X_i(n-2I) - X_i(n-6I) \qquad (3)$$

Where $X_o(n)$ is the video signal on line 9, $X_i(n)$ is the video signal of line 1, and I is the time for delaying one picture element having a value of $\frac{1}{4}f_{sc}$. Thus, the band-pass filter 111 has the functional relationship of the Equation (3). As shown in the frequency characteristic according to the Equation (3), the band-pass filter has the characteristic having the highest gain near the frequency "$f_{sc}$" of the color carrier wave, as shown in the characteristic graph 210 of FIG. 2A.

Figure 4:
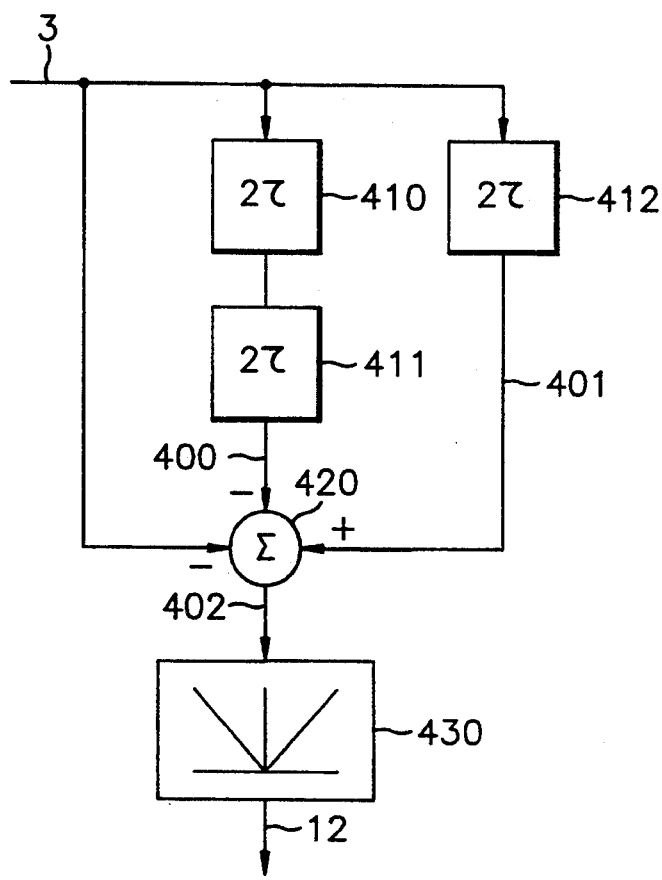
FIG. 4 is a detailed block diagram of the horizontal transition sensing device of FIG. 1.
Figure 5:
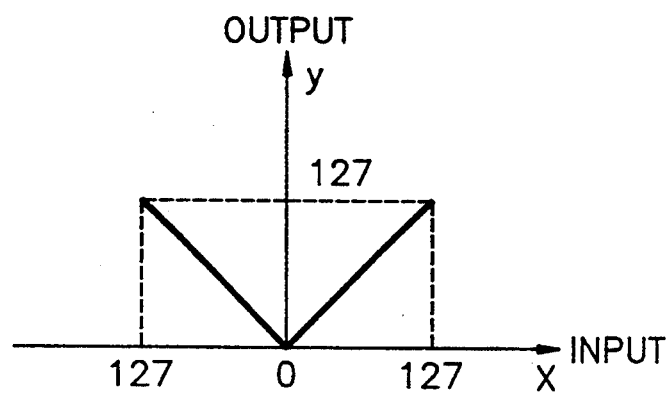
FIG. 5 is a characteristic graph for illustrating the characteristic of the absolute-value device of FIG. 4.

Referring to FIG. 4, the horizontal transition sensing device 130 comprises: two two-picture element delay circuits 410 and 411 connected in series between line 3 and line 400 for delaying the first brightness signal of line 3 for a time delay period of four picture elements; a two-picture element delay circuit 412 connected between line 3 and line 401 for delaying the first brightness signal for a time delay period of two picture elements; a band-pass filtering device for detecting the high frequency brightness signal of the horizontal synchronizing frequency from the brightness signal of line 3, and having a subtractor 420 for subtracting the brightness signals of lines 3 and 400 from the brightness signal of line 401 to output the resultant signal through line 402; and an absolute value device 430 connected between line 420 and line 12 for converting the output of the band pass filter into the absolute value to output a converted signal through line 12. FIG. 5 represents an operational characteristic of the absolute value device 430 of FIG. 4. With reference to FIG. 5 and the characteristic graph 230 of FIG. 2D, FIG. 4 will now be detailedly described.

Into line 3 is input the first brightness signal that is obtained by combining the brightness signals of the low and high frequency components through the adder 120 of FIG. 1. The two two-picture element delay circuits 410 and 411 delay the first brightness signal of line 3 for a time delay period of four picture elements, outputting the delayed signal through the line 400 to the subtractor 420. Also, the two-picture element delay circuit 412 delays the brightness signal of line 3 for a time delay period of two picture elements, and outputs the delayed signal through line 401 to the subtractor 420. Then, the subtractor 420 subtracts the brightness signals of the two lines 3 and 400 from the brightness signal of line 401 to detect the high frequency brightness signal of the horizontal synchronizing frequency from the brightness signal of line 3. Consequently, having the three two-picture element delay circuits 410-412 and the subtractor 420 perform the function of a band pass filter to detect the brightness signal having the frequency ranging between the horizontal synchronizing frequency "$f_{sh}$" and the frequency "$2f_{sc}-f_{sh}$" corresponding to a time delay period of picture elements. The absolute value device 430 converts the output of the subtractor 420 input through line 402 into an −absolute value, thereby outputting the converted signal through line 12 to the motion signal comparator 140. The input/output characteristic of the absolute value device 430 is shown in FIG. 5, while the frequency characteristic of the band pass filter through the absolute value device 430 is shown in the characteristic graph 230 of FIG. 2D. The transfer function of line 12 for the brightness signal of line 3 is represented by Equation (4).

$$Y_{12}(n) = Y_3(N+2I) - Y_2[Y_3(n) + Y_3(n+4I)] \qquad (4)$$

where $Y_{12}(n)$ is the brightness signal of line 12, and $Y_3(n)$ is the brightness signal of line 3.

Figure 6:
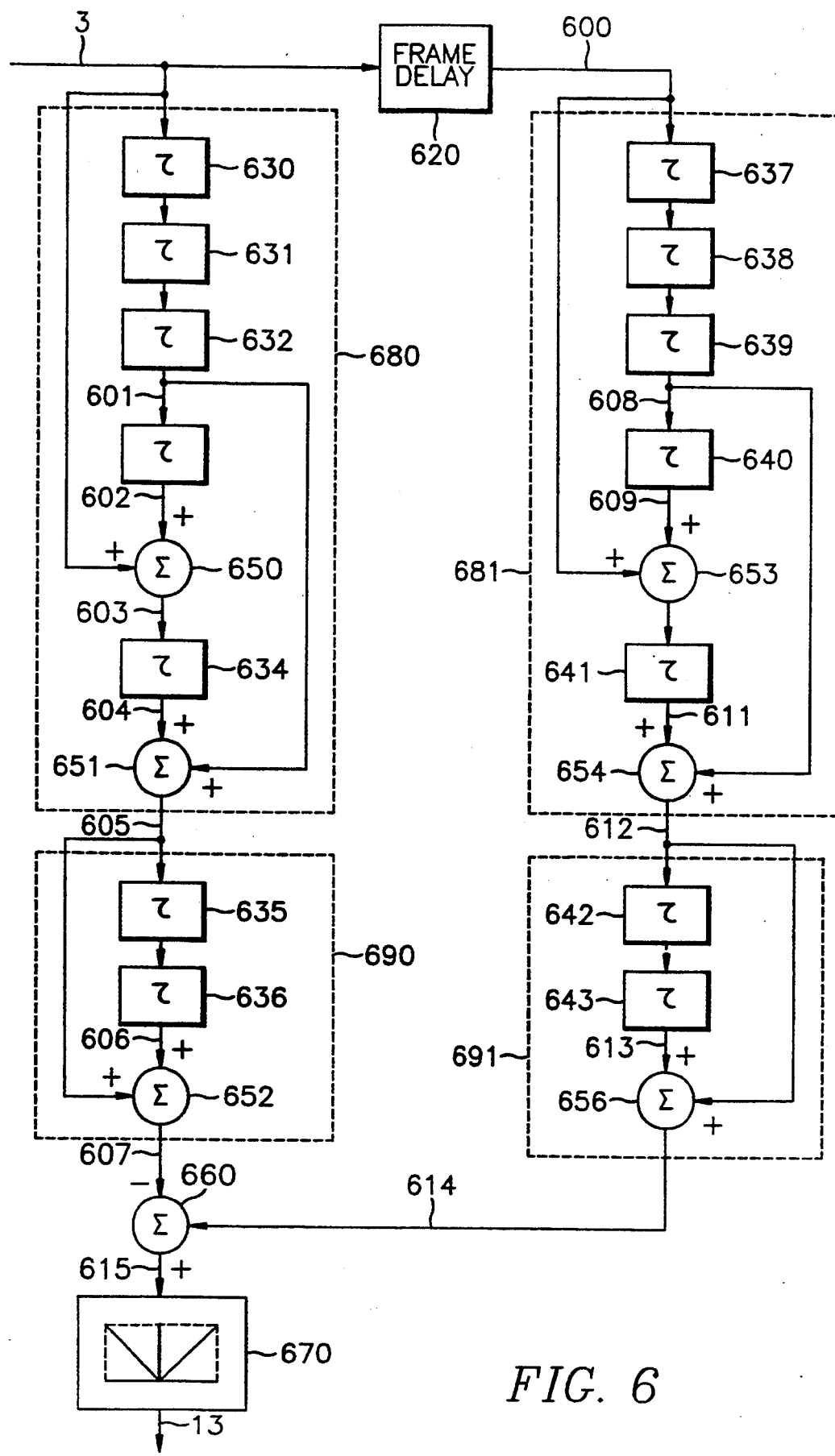
FIG. 6 is a detailed circuit diagram of the time-dependent transition sensing device of FIG. 1.

Referring to FIG. 6, the time motion sensing device 131 is shown in detail, in which a frame delay device 620 delays the first brightness signal of line 3 by a frame period to output a delayed signal through line 600. Three picture element delay circuits 630–632 connected in series delay the first brightness signal of line 3 for a time delay period of three picture elements, and output the delayed signal through line 601. A picture element delay circuit 633 further delays the brightness signal of line 601 for a time delay period one picture element, and thereby outputs the delayed signal through line 602.

Then, an adder 650 adds the brightness signal of line 602 and the first brightness signal of line 3, and thereby outputs the added signal through line 603. Thereafter, a picture element delay circuit 634 delays the brightness signal from the adder 650 for a time delay period of one picture element, and thereby outputs the delayed signal through line 604.

Therefore, a first band pass damping filter 680 filters with band pass damping the first brightness signal of line 3, includes an adder 651 for adding the brightness signals of the lines 604 and 601, and thereby outputs the added signal through line 605.

In addition, two picture element delay circuits 635, 636 connected in series between the lines 605 and 606 delay the brightness signal filtered with band pass damping through the first band pass damping filter 680 for a time delay period of two picture elements, and output the delayed signal through line 606. Accordingly, a first low pass filter 690 for filtering the brightness signal of the line 605, includes an adder 652 for adding the brightness signals of lines 605 and 606, and outputs the added signal through line 607.

On the other hand, a second band pass damping filter 681 filters with band pass clamping the first brightness signal input through line 600 from the frame delay device 620, and outputs the filtered signal through line 612. The second band pass damping filter has the same construction as the first band pass damping filter. Also, a second low pass filter 691 filters the brightness signal input through line 612 from the second band pass damping filter 681, and outputs the filtered signal through line 614. The second low pass filter also has the same construction as the first low pass filter.

Moreover, a subtractor 660 subtracts the brightness signal of line 607 from the brightness signal of line 614 to detect the brightness signal difference between frames. Thereafter, an absolute value device 670 connected to the subtractor 660 through line 615 converts the brightness signal difference into the absolute value, and outputs the converted signal through line 13.

Referring to FIGS. 6 and 7A through 7C, more specific description will now be given.

The frame delay device 620 delays the first brightness signal of line 3 for a time delay period of one frame and outputs the delayed signal through line 600 to the second band pass damping filter 681. The first band pass damping filter 680 filters the first brightness signal of line 3 to produce the brightness signal dampened of the gain in a given frequency band. The dampened signal is output through line 605 to the first low pass filter 690.

Now, the operation of the first band pass dampening filter 680 will be specifically described. The adder 650 adds the brightness signal of line 3 and the brightness signal of line 602 delayed for a time delay period of four picture elements through the four picture element delay circuits 630-633, output the added signal through line 603 to the picture element circuit 634. The adder 651 whose input terminals receive the outputs of the adder 650 through the picture element delay circuit 634 and the line 601, adds the brightness signal of the line 604 and the brightness signal of the line 601 which is delayed by the three picture element circuits 630-632. Thus, the added signal is output through line 605 to the first low pass filter 690. The brightness signals of line 605 and the brightness signal of line 3 have the transfer function of Equation (5).

$$Y_{605}(n) = Y_3(n) + Y_3(n-2I) + Y_3(n-4I) \tag{5}$$

The frequency characteristics, as shown in a characteristic graph 701 of FIG. 7A, have a gain that is dampened near ½ color carrier wave frequency ½$f_{sc}$.

The first low pass filter 690 filters the band dampened brightness signal input through line 605 from the first band pass damping filter 680, and outputs the filtered signal through line 607 to the subtractor 660. The operation of the first low pass filter 690 will be further described. The two picture element delay circuits 635, 636 delay the band dampened brightness signal of line 605 for a time delay period of two picture elements, and output the delayed signal through line 606. The adder 652 adds the brightness signals of lines 606 and 605, and output the added signal through line 607 to the subtractor 660. The transfer function of the first low pass filter 690 representing the relationship between the brightness signals of lines 605 and 607 is expressed by Equation (6):

$$Y_{607}(n) = Y_{605}(n) + Y_{605}(n-2I) \tag{6}$$

This frequency has a gain characteristic, whereby the gain is dampened near the color carrier wave frequency "$f_{sc}$", as shown in the characteristic graph 702 of FIG. 7B.

The combined transfer function of the first band pass damping filter 680 and the first low pass filter 690 which represents the relationship between the brightness signals of lines 3 and 607, is expressed by Equation (7).

$$\begin{aligned}Y_{607} &= Y_3(n) + Y_3(n-2I) + Y_3(n-4I) + Y_3(n-2I)\\ &\quad + Y_3(n-4I) + Y_3(n-6I)\\ &= Y_3(n) + 2Y_3(n-2I) + 2Y_3(n-4I) + Y_3(n-6I)\end{aligned} \tag{7}$$

This frequency has a gain characteristic, whereby the gain is relatively high only below the half color carrier wave frequency "$f_{sc}$", as shown in the characteristic graph 703 of FIG. 7C. Consequently, only the low frequency brightness signal is detected. Of course, the second band pass damping filter 681 processes the output of the frame delay device 620 received through line 600 in the same manner as the first band pass damping filter 680, output the processed signal through line 612 to the second low pass filter 691. The five picture element delay circuits 637-641 and the two adders 653 and 654 of the second band pass damping filter 681 operate in the same manner as those of the first band pass damping filter 680. The functional relationship between the brightness signals of the lines 600 and 612 is expressed by Equation (8):

$$Y_{612}(n) = Y_{600}(n) + Y_{600}(n-2I) + Y_{600}(n-4I) \tag{8}$$

The frequency characteristic is as shown the characteristic graph 701 of FIG. 7A.

$$Y_{614}(n) = Y_1(n) + Y_1(n-2I) \tag{9}$$

The frequency characteristic is as shown in the characteristic graph 702 of FIG. 7B. The combined transfer function of the second band pass damping filter 681 and the second low pass filter 691 representing the relationship between the brightness signals 2V of the lines 600 and 614 is expressed by Equation (10):

$$\begin{aligned}Y_{614}(n) &= Y_{600}(n) + 2Y_{600}(n-2I) + 2Y_{600}(n-4I)\\ &\quad + Y_{600}(n-6I)\end{aligned} \tag{10}$$

The frequency characteristic is as shown in the characteristic graph 703 of FIG. 7C. Additionally, the relationship between the brightness signals of lines 3 and 614 is expressed by Equation (11):

$$\begin{aligned}Y_{614} &= Y_3(n-) + 2Y_3(n-2V-2I) + 2Y_3(n-2V-4I)\\ &\quad + Y_3(n-2V-6I)\end{aligned} \tag{11}$$

Where V is the time for delaying one field of the screen. Consequently, the relation between the brightness signals of the lines 614 and 607 is expressed as follows:

$$Y_{614}(n) = Y_{607}(n-2V) \tag{12}$$

Hence, the brightness signal of line 614 is the brightness signal of line 607 delayed for a time delay period of one frame. The subtractor 660 subtracts the brightness signal of line 607 from the brightness signal of line 614 to detect the brightness signal difference between frames, i.e., the brightness signal motion on a temporal axis. Then, the absolute value device 670 converts the brightness signal difference between frames received through line 615 from the subtractor 660 into the absolute value, and outputs the converted signal through line 13 to the motion signal comparator 140.

In this case, the brightness signal of line 13 is expressed by Equation (13):

$$Y_{13}(n) = |Y_{607}(n-2V) - Y_{607}(n)| \tag{13}$$

Figure 8:
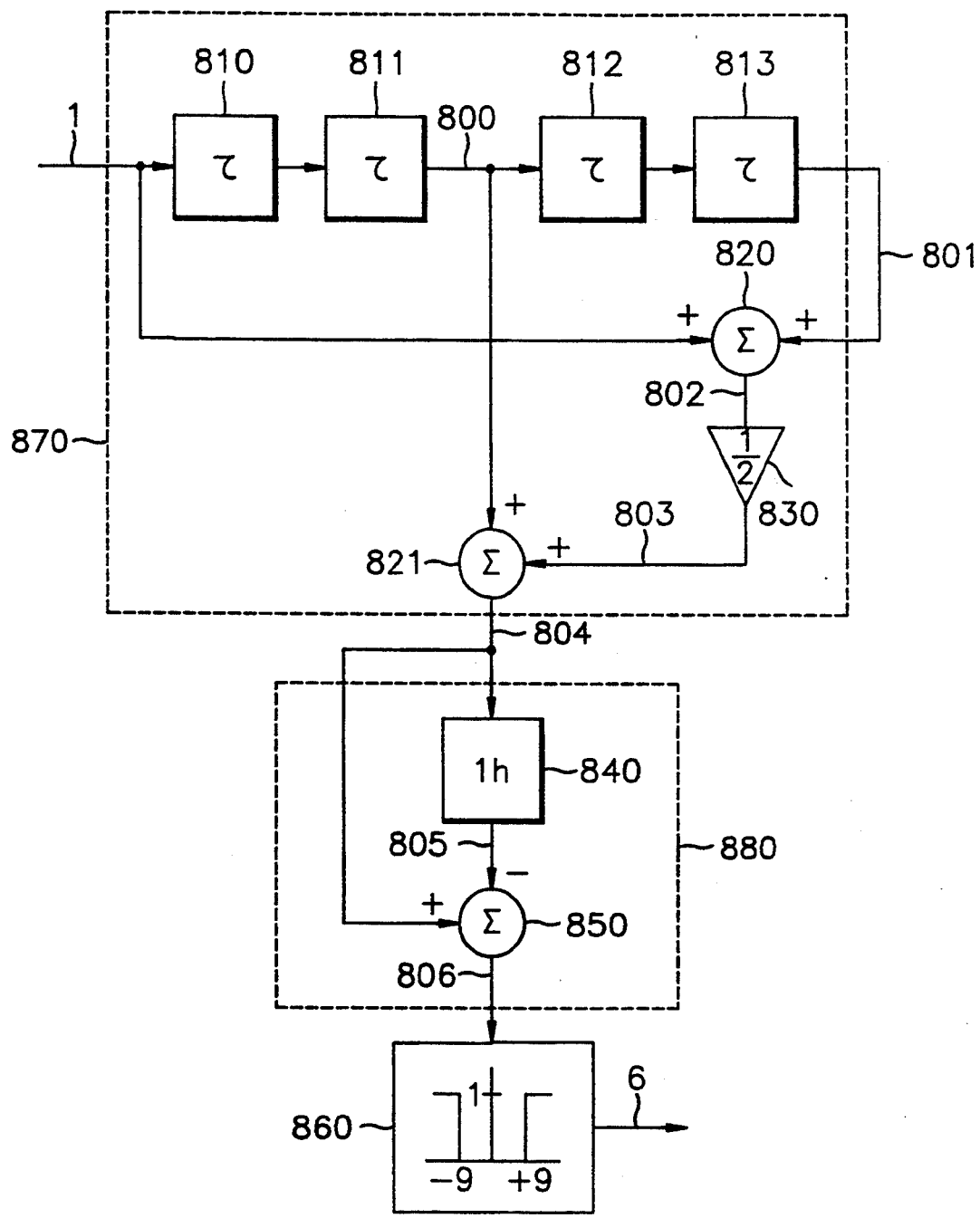
FIG. 8 is a detailed circuit diagram of the vertical motion sensing device of FIG. 1.

Referring to FIG. 8, the vertical transition sensing device 132 comprises: a low pass filter 870 connected between lines 1 and 804, for detecting the low frequency brightness signal from the digital composite video signal of the line 1 by eliminating the high frequency color signal with four picture element delay circuits 810-813 and two adders 821 and 820 and a halving device 830; a high pass filter 880 for detecting the high frequency brightness signal offset in a given frequency from the brightness signal output from the low pass filter 870, with a line delay device 840 and a subtractor 850, the detected signal through line 806; and an absolute value quantizing device 860 for quantizing and converting into the absolute value the output of the high-pass filter 880 received through line 806 to output the converted signal through line 6.

Referring further to FIG. 8, the A-D converter 100 of FIG. 1 outputs the composite video signal through line 1. The two picture element delay circuits 810 and 811 delay the digital video signal for a time delay period of two picture elements, and produce an output through line 800. Also, the two picture element delay circuits 812 and 813 connected in series between lines 800 and 801, delay the digital composite video signal of line 800 for a time delay period of two picture elements, and produce an output through line 801 to the adder 820. The adder 820 adds the digital video signal of line 1 and the digital composite video signal delayed for a time delay period of four picture elements, and outputs an added signal through line 802 to a halving device 830. The halving device 830 halves the output of the adder 820, and produces an output through line 803 to the adder 821. Then, the adder 821 adds the digital video signal of line 800 and the output of the halving device 830 received through line 803, and outputs an added signal through the line 804. The transfer function which represents the input/output relationship between the lines 804 and 1 is expressed by Equation (14):

$$Y_{804}(n) = \tfrac{1}{2}[Y_1(n) + Y_1(n-4l)] + Y_1(n-2l) \quad (14)$$

The frequency characteristics are as shown in the characteristic graphs of FIGS. 2A and 2B. The low frequency brightness signal output through line 804 is obtained by eliminating the high frequency brightness signal and the color signal from the digital composite video signal. Hence, the low-pass filter 870 which is comprised of four picture element delay circuits 810–813 and two adders 820 and 821 and a halving device 830 outputs the low frequency brightness signal through line 804.

The high pass filter 880 which is comprised of the line delay device 840 and the subtractor 850, detects the brightness signal offset in half horizontal synchronizing frequency "$\tfrac{1}{2}f_h$" which is in 2 the high frequency region of the brightness signal of line 804 with reference to the horizontal synchronizing frequency "$f_h$", and outputs the brightness signal through line 806 to the absolute value quantizing device 860.

Now, the operation of the high pass filter 880 will be more specifically described. The line delay device 840 delays the brightness signal of line 804 for a time delay period of the horizontal scanning, and outputs the delayed brightness signal through line 805 to the subtractor 850. The subtractor 850 subtracts the delayed brightness signal of line 805 from the brightness signal of line 804 to output the signal difference through the line 806 to the absolute value quantizing device 860. The transfer function of the high pass filter 880 representing the relationship between the lines 804 and 806 is expressed by Equation (15):

$$Y_{806}(n) = Y_{804}(n) - Y_{804}(n-h) \quad (15)$$

The frequency characteristic has the spectrum as shown in the characteristic graph 220 of FIG. 2C; and the brightness signal distributed in the curve 201 of the characteristic graph 200 of FIG. 2A is the vertical motion component.

As stated above, the absolute value quantizing device 860 quantizes and converts into the absolute value the output of the high pass filter 880 received through line 806, and outputs the quantized signal through line 6 to the second motion compensator 151. For example, if the output gain of the high pass filter 880 is lower than a binary −9 or higher than the binary +9, the absolute value becomes a logic "1". Otherwise, if the output gain of the high pass filter 880 is higher than the binary −9 and lower than the binary +9, the absolute value becomes logic "0".

Figure 9:
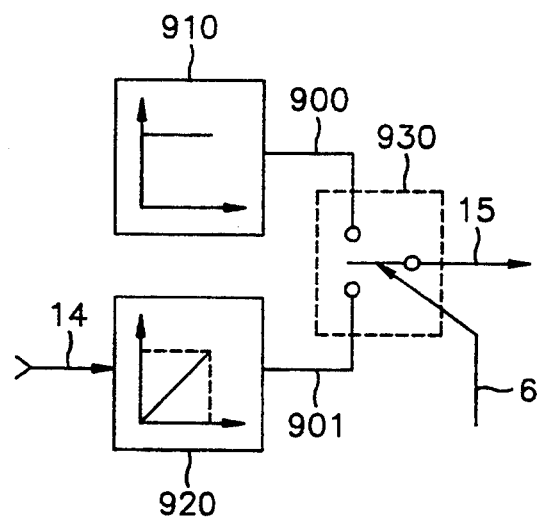
FIG. 9 is a detailed circuit diagram of the second motion compensator of FIG. 1.

Referring now to FIG. 9, the second motion compensator 151 of FIG. 1 comprises: a buffer circuit 920 connected between the lines 14 and 901, for buffering the output of the first motion compensator 150 received through line 14, to produce and output through line 901; a reference voltage generator 910 for generating a reference voltage of a given level through line 900; and a switching device 930 for enabling transmission of either the output of the reference voltage generator 910 received through line 900 or the output of the buffer circuit 920 received through line 901 according to a logic state of the vertical motion sensing signal received through line 6.

With reference to FIG. 9, the second motion compensator 151 will now be more specifically described. The reference voltage generator 910 generates the reference signal of a given voltage level set by the user. The buffer circuit 920 buffers the output of the first motion compensator 150 received through line 14, and produces an output through line 901. The switching device 930 enables transmission of the output of the reference voltage generator 910 through line 15 to the mixer 160 if the vertical motion sensing signal received through line 6 is of a high logic state, and enables transmission of the output of the buffer circuit 920 through line 15 to the mixer if the vertical motion sensing signal is low logic state.

Figure 10:
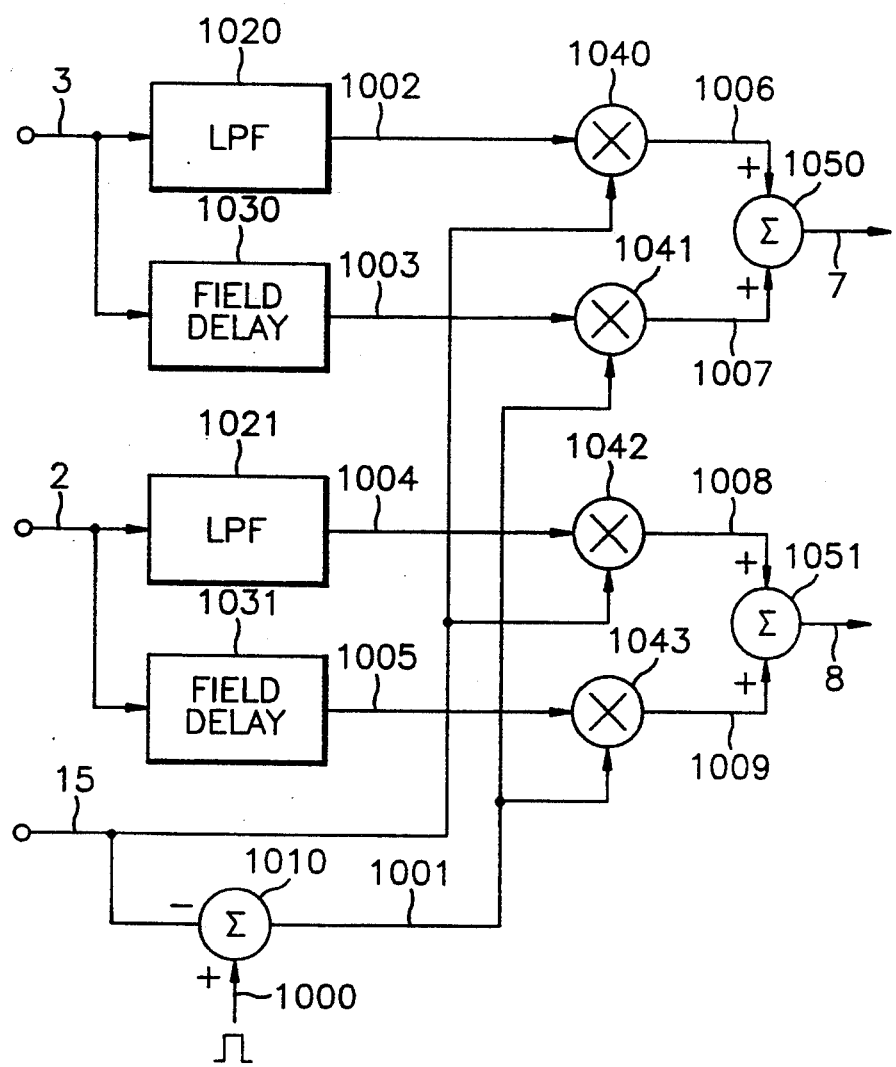
FIG. 10 is a detailed block diagram of the mixer of FIG. 1.

Referring to FIG. 10, the mixer 160 of FIG. 1 comprises: a subtractor 1010 connected between lines 15, 1000 and 1001, for subtracting the motion sensing signal of the 15 from the reference set value logic "1" of line 1000 to complement the value of the motion sensing signal of line 15 to produce an output through line 1001; a low pass filter 1020 connected between lines 3 and 1002; a field delay device 1030 connected between lines 3 and 1003; a multiplier 1040 for multiplying the output of the low pass filter 1020 received through line 1002 and the motion sensing signal of line 15 to produce an output through line 1006; a multiplier 1041 for multiplying the output of the field delay device 1030 received through line 1003 and the compensated motion sensing signal of line 1001 to be an output through line 1007; a first compensating device for compensating the first brightness signal input through line 3 with the motion sensing signal of line 15, and the complemented motion sensing signal of line 1001 and the brightness signal of line 1003 to produce an output through line 7, the first compensating device including an adder 1050 for adding the output of the multiplier 1040 received through line 1006 and the output of the multiplier 1041 received through line 1007; and a second compensating device connected between lines 2, 8, 15 and 1001, for compensating the first color signal input through line 2 with the motion sensing signal of lines 15 and the complemented motion sensing signal of line 1001, to produce an output through line 8, the second compensating device having the same construction as the first compensating device.

With reference to FIG. 10, the mixer 160 will be more specifically described. Through line 1000 connected with the reference supplying voltage Vdd is supplied the logic "1" to the subtractor 1010. Through line 15 connected with the second motion compensator 151 is supplied the motion sensing signal output from the second motion compensator 151 to the subtractor 1010 and the multipliers 1040 and 1042. The first color signal output from the comb filter 112 is applied through the line 2 to the low pass filter 1021 and the field delay means 1031.

On the other hand, the brightness signal output from the adder 120 through line 3 is applied to the low pass filter 1020 and the filed delay device 1030. The subtractor 1010 which receives the motion sensing signal of the line 15 and the reference set value logic "1" of line 1000, subtracts the motion sensing signal from the reference set value logic "1", thereby applying the complemented motion sensing signal through line 1001 to the two multipliers 1041 and 1043. The first compensating device which receives the first brightness signal of line 3, the motion sensing signal of line 15, and the complemented motion sensing signal of line 1001, interpolates the first brightness signal of line 3 for one field period, and multiplies respectively the interpolated first brightness signal and the present first brightness signal by the complemented motion sensing signal of line 1001 and the motion sensing signal of line 15 to output the second brightness signal by compensating the first brightness signal through line 7.

The operation of the first compensating device will be detailedly described. The low pass filter 1020 filters the first brightness signal of line 3 to produce an output through line 1002 to the multiplier 1040. The filed delay device 1030 delays the first brightness signal of line 3 for a time delay period of one vertical scanning to produce an output through line 1003 to the multiplier 1041. The multiplier 1040 multiplies the low frequency first brightness signal output through line 1002 from the low pass filter 1020 and the motion sensing signal of line 15 to produce an output through line 1006 to the adder 1050. The multiplier 1041 multiplies the output of the field delay device 1030 received through line 1003 and the complemented motion sensing signal of line 1001 to produce an output through line 1007 to the adder 1050. The adder 1050 adds the outputs of the two multipliers 1040 and 1041 through two lines 1006 and 1007, to produce an output through line 8. The transfer function of the first compensating means representing the relationship between the first and second brightness signals is expressed by Equation (16).

$$Y_7 = RY_3(n)LPF + (1-R)Y_3(n-V) \qquad (16)$$

Similarly, the second compensating device which receives the first color signal of line 2, the motion sensing signal of line 15 and the complemented motion sensing signal of line 1001 compensates the first color signal to produce the second color signal in the same manner as the first compensating device. The second color signal is transmitted through line 8. Of course, the low pass filter 1021, the field delay device 1031, two multipliers 1042 and 1043 and the adder 1051 which constitute the second compensating device operate in the same manner as those of the first compensating device. The transfer function of the second compensating means representing the relationship between the first and second color signals is expressed by Equation (17).

$$C8(n) = RC_2(n)LPF + (1-R)C_2(n-V) \qquad (17)$$

In the above Equations (16) and (17), $C2(n)$ is the first color signal, $C8(n)$ the second color signal, $Y3(n)$ the first brightness signal, $Y7(n)$ the second brightness signal, and $V$ the vertical scanning period.

As described above, the inventive circuit detects, as the motion of the digital composite video signal, the brightness and color signals of one field digital composite video signal for interlaced scanning, and compensates the separated primary brightness signal and the separated primary color signal with the detected motion signal to produce the secondary brightness signal and the secondary color signal, so that the two brightness signals and the two color signals are combined to perform the sequential scanning.

Although specific constructions and procedures of the invention have been illustrated and described herein, it is not intended that the invention be limited to the elements and constructions disclosed. One skilled in the art will easily recognize that the particular elements or subconstructions may be used without departing from the scope and spirit of the invention.

What is claimed is:

1. A motion compensation system in a digital television including an analog-digital converter for converting an interlaced scanning video signal into a digital video signal, said motion compensating system comprising:

color/brightness signal separating means for separating a first color signal and a first brightness signal from said digital video signal;

picture motion sensing means for detecting an amount of horizontal transition and temporal motion of a picture from said first brightness signal and an amount of vertical transition of the picture from said digital video signal for enabling comparison and compensation of said amounts of horizontal and vertical transition and temporal motion to obtain a motion signal indicative of motion of a picture; and mixing means for interpolating the first color signal and the first brightness signal to produce an interpolated color signal and an interpolated brightness signal, and for compensating respectively the interpolated color signal and the first color signal, and the interpolated brightness signal and the first brightness signal in dependence upon said motion signal, each set of color signals and brightness signals being mixed to produce a second color signal and a second brightness signal for the interlaced scanning.

2. The motion compensating system as claimed in claim 1, wherein said color/brightness signal separating means comprises:

low-pass filter means for detecting a third brightness signal distributed in a low frequency band of said digital video signal;

band-pass filter means for detecting a first video signal of a given frequency band from said digital video signal;

comb filter means for separating said first video signal into the first color signal and a fourth brightness signal distributed in a given frequency band; and adder means for adding the fourth brightness signal of said comb filter means and the third brightness signal of said low pass filter means to produce said first brightness signal.

3. The motion compensating system as claimed in claim 2, wherein said band-pass filter means comprises:

first delay means for delaying said digital video signal for four picture elements to provide a first delayed video signal;

adder means for adding said digital video signal and said first delayed video signal to provide a resultant video signal;

second delay means for delaying said resultant video signal for two picture elements to provide a second delayed video signal; and subtractor means for subtracting said second delayed video signal from said resultant video signal to provide said first video signal.

4. The motion compensating system as claimed in claim 1, wherein said picture motion sensing means comprises:

horizontal transition sensing means for detecting horizontal transition components of the picture from said first brightness signal;

time motion sensing means for detecting temporal motion components of the picture from said first brightness signal;

motion signal comparator means for comparing the output signals of said horizontal transition sensing means and said time motion sensing means with each other to pass through only the signal of greater value as a first signal;

vertical transition sensing means for detecting vertical transition components of the picture from said digital video signal;

first motion compensator means for compensating temporal motion variation of the picture from said first signal to produce a temporal motion compensated signal; and second motion compensator means responsive to the output of said vertical transition means, for multiplying said temporal motion compensated signal from the first motion compensator by a constant rate or maintaining the output at a given level according to the logic states of said output signal of said vertical transition sensing means so as to detect the temporal and spatial motion variation of the picture to produce said motion signal.

5. The motion compensating system as claimed in claim 4, wherein said mixing means comprises:

subtractor means for complementing the value of said motion signal by subtracting said motion signal from a reference value to provide a complemented motion signal;

first compensating means for compensating said first brightness signal in dependence upon said motion signal and the complemented motion signal; and second compensating means for compensating said first color signal in dependence upon said motion signal and the complemented motion signal.

* * * * *